United States Patent
Behling et al.

(10) Patent No.: US 11,858,762 B2
(45) Date of Patent: Jan. 2, 2024

(54) METHOD FOR TRANSFERRING CARGO FROM A CARGO RECEIVING PORTION OF A VEHICLE, AND VEHICLE FOR CARRYING OUT SAID METHOD

(71) Applicant: Fraunhofer-Gesellschaft zur Foerderung der Angewandten Forschung e.V., Munich (DE)

(72) Inventors: Jan Behling, Munich (DE); Mathias Rotgeri, Munich (DE); Jan Soeren Emmerich, Munich (DE); Dirk Hoening, Munich (DE); Patrick Klokowski, Munich (DE); Christian Hammermeister, Munich (DE); Michael Ten Hompel, Munich (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 48 days.

(21) Appl. No.: 17/635,056

(22) PCT Filed: Aug. 7, 2020

(86) PCT No.: PCT/EP2020/072260
§ 371 (c)(1),
(2) Date: Feb. 14, 2022

(87) PCT Pub. No.: WO2021/032508
PCT Pub. Date: Feb. 25, 2021

(65) Prior Publication Data
US 2022/0289505 A1 Sep. 15, 2022

(30) Foreign Application Priority Data
Aug. 16, 2019 (DE) .................... 10 2019 122 055.6

(51) Int. Cl.
*B65G 67/24* (2006.01)
*B60P 1/52* (2006.01)
(Continued)

(52) U.S. Cl.
CPC ............... *B65G 67/24* (2013.01); *B60P 1/52* (2013.01); *G05D 1/0225* (2013.01);
(Continued)

(58) Field of Classification Search
CPC ........ B60P 1/52; B60P 7/0892; G05D 1/0225; G05B 2219/31002; G05B 19/41895; G05B 19/416; B65G 67/24; B64D 1/08
See application file for complete search history.

(56) References Cited

U.S. PATENT DOCUMENTS 5,109,971 A * 5/1992 Riner ..................... B65G 69/24
193/40
5,360,308 A 11/1994 Hansen
(Continued)

FOREIGN PATENT DOCUMENTS

| CN | 204324434 U | 5/2015 |
| CN | 105538326 A | 5/2016 |

(Continued)

OTHER PUBLICATIONS

International Search Report of PCT/EP2020/070407, dated Oct. 23, 2020.
(Continued)

*Primary Examiner* — Kaitlin S Joerger
(74) *Attorney, Agent, or Firm* — Collard & Roe, P.C.

(57) ABSTRACT

According to a method for transferring a cargo from a cargo receiving portion of a vehicle onto a cargo take-up station, the vehicle is controlled by a vehicle control unit such that the vector of the velocity of the vehicle is modified immediately before, or upon its arrival at the cargo take-up station
(Continued)

Figure 1:
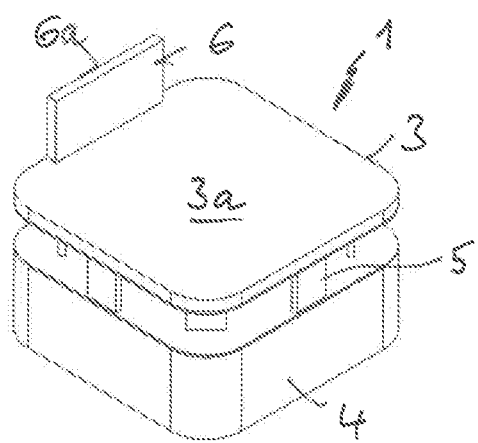

and the vehicle is oriented by the vehicle control unit and/or by at least one guide system positioned in the region of the cargo take-up station before the arrival of the vehicle at the cargo take-up station, such that the trajectory of the cargo that is moving away from the cargo receiving portion as a result of the modification in the velocity vector, ends at a receiving region of the cargo take-up station.

13 Claims, 5 Drawing Sheets

(51) Int. Cl.
- *G05D 1/02* (2020.01)
- *B60P 7/08* (2006.01)
- *B65G 69/00* (2006.01)

(52) U.S. Cl.
CPC .......... *B60P 7/0892* (2013.01); *B65G 69/006* (2013.01); *G05D 2201/0216* (2013.01)

(56) References Cited

U.S. PATENT DOCUMENTS

| | | | |
|---|---|---|---|
| 2011/0106362 A1 | 5/2011 | Seitz | |
| 2014/0255137 A1* | 9/2014 | Haertel | B64D 9/00 |
| | | | 414/529 |
| 2020/0339348 A1* | 10/2020 | Durai | B66F 9/063 |
| 2021/0247774 A1* | 8/2021 | Hotta | G05D 1/0244 |

FOREIGN PATENT DOCUMENTS

| | | | | |
|---|---|---|---|---|
| CN | 208018986 U | | 10/2018 | |
| DE | 694 04 649 T2 | | 2/1998 | |
| DE | 10 2005 049 159 A1 | | 5/2006 | |
| DE | 10 2008 030 546 A1 | | 12/2009 | |
| DE | 10 2008 039 764 B4 | | 11/2010 | |
| DE | 20 2012 010 247 U1 | | 10/2013 | |
| DE | 10 2015 118 313 A1 | | 4/2017 | |
| DE | 10 2015 114 370 B4 | | 3/2018 | |
| DE | 102019122055 A1 | * | 2/2021 | ............ B60P 1/52 |
| EP | 2 093 642 A1 | | 8/2009 | |
| EP | 3 378 769 A1 | | 9/2018 | |
| WO | WO-2022096185 A1 | * | 5/2022 | ............ B65G 65/00 |

OTHER PUBLICATIONS

International Search Report of PCT/EP2020/072260, dated Oct. 28, 2020.

\* cited by examiner

METHOD FOR TRANSFERRING CARGO FROM A CARGO RECEIVING PORTION OF A VEHICLE, AND VEHICLE FOR CARRYING OUT SAID METHOD

CROSS REFERENCE TO RELATED APPLICATIONS

This application is the National Stage of PCT/EP2020/072260 filed on Aug. 7, 2020, which claims priority under 35 U.S.C. § 119 of German Application No. 10 2019 122 055.6 filed on Aug. 16, 2019, the disclosure of which is incorporated by reference. The international application under PCT article 21(2) was not published in English.

The invention relates to a method for transfer of cargo from a cargo receiving portion of a vehicle onto a cargo take-up station.

Furthermore, the invention relates to a vehicle for performance of such a method with a cargo receiving portion, which is disposed on a chassis, wherein the cargo receiving portion is designed to be open or openable along at least one side rim.

In transport systems, especially in sorting systems, cargoes from at least one dispensing station are transported and sorted in at least one cargo take-up station. In a highly dynamic sorting system formed from individual vehicles and capable of high throughput, a high-throughput and thus fastest possible transfer of cargo from the vehicle to the cargo take-up station (terminal point) is necessary. For this purpose, ideally it should be possible, for cost reasons, for the cargo transfer to be initiated completely by the vehicle itself and to not require any actively driven elements at the cargo take-up stations, and even additional active elements on the vehicle that are needed only for transfer should be avoided as much as possible for cost reasons.

In the prior art, a large number of transfer principles are known both for driverless transport vehicles and also from the field of conventional sorting technology. Driverless transport vehicles mostly have active load-receiving means (usually horizontally and/or partly vertically movable).

These include roller tracks, belt conveyors, fork arms, lifting platforms, articulated robots, specific grippers, tilt trays and the like. Such driverless transport vehicles are therefore very complex.

Some driverless transport vehicles have passive platforms, from which a person or a stationary active technology removes something.

Two solutions are also known in which both the respective driverless transport vehicle and the cargo take-up station are passive. From DE 10 2008 039 764 B4, an apparatus is known for comb-like stripping of transport goods during the travel of the driverless transport vehicle through a station, wherein the cargo is retained at a static stop of the station. However, this procedure may lead to damage to the cargo at higher velocities.

From DE 10 2015 114 370 B4, a driverless transport system for a warehouse and picking installation is known, in which no collection of several transport goods delivered in succession is possible unless an active intervention takes place beforehand (removal by a person or transport away by means of active stations).

From DE 694 04 649 T2, a tilting apparatus for vehicles having loading trays is known. The vehicle is driven to a platform of the tilting apparatus and stopped. Then the platform is tilted. In order to loosen the cargo so that it slides into a trough, the platform on which the vehicle is located is shaken in tilted position (horizontal forward and back motion). For transfer of cargo to the trough, a tilting apparatus equipped with a complex shaking device is therefore necessary at the cargo take-up station.

From DE 10 2015 118 313 A1, an unloading apparatus for vehicles having a loading bed is known that can be brought up to a vehicle having a loading bed after the vehicle has stopped. The apparatus has a frame that surrounds the load on the loading bed and is connected with a rack. The vehicle then travels on drive-over extensions, whereby the loading bed is pulled away under the frame and the cargo is off-loaded. A cargo delivery to the cargo take-up station is therefore possible only with an additional unloading apparatus, which must be operated partly manually.

The task of the invention is to create a solution having driverless vehicles in which the cargo transfer is initiated by the vehicle itself, without the need for actively driven elements at the cargo take-up station and on the vehicle.

According to the invention, this task is accomplished in a method of the type indicated in the introduction in that the vehicle is controlled by a vehicle control unit in such a way that the vector of the velocity of the vehicle is changed immediately before or upon arrival at the cargo take-up station and the vehicle, before arrival at the cargo take-up station, is oriented by the vehicle control unit and/or by at least one guide device disposed in the region of the cargo take-up station in such a way that the trajectory of the cargo moving away from the cargo receiving portion due to the change of the velocity vector ends in a receiving area of the cargo take-up station.

According to the invention, the transfer of the cargo from the vehicle to the cargo take-up station therefore takes place without additional elements but solely due to the inertia of the cargo. In the process, the vector of the velocity of the vehicle is changed immediately before or upon arrival at the cargo take-up station, i.e. either the velocity value as such is abruptly reduced by braking or the like and/or the direction of the velocity is changed, so that the cargo itself, due to its inertia, continues moving with the original velocity vector (reduced by the frictional deceleration) and moves from the cargo receiving portion into the cargo take-up station. For this purpose the vehicle is oriented beforehand by the vehicle control unit and/or by at least one guide device disposed in the region of the cargo take-up station in such a way that it is ensured that the cargo lands on the receiving area of the cargo take-up station.

In this connection, it may be provided according to a first configuration that the vehicle is braked by the vehicle control unit upon arrival at the cargo take-up station. By a suitable braking, the velocity difference between the original velocity and the reduced velocity of the vehicle may be so large that the cargo, due to its inertia, moves onto the cargo take-up station.

In addition, it may be provided that the vehicle is driven by the vehicle control unit against the cargo take-up station, so that a collision with the cargo take-up station therefore takes place. For this purpose the cargo take-up station may be equipped with a shock-absorbing and/or spring element (bumper), which cushions the collision process and if necessary imparts the absorbed kinetic energy to the vehicle, which is then repelled with high acceleration in a different direction.

Alternatively, it may also be provided that the vehicle is driven by the vehicle control unit against the cargo take-up station without being braked.

In the two embodiments described in the foregoing, the vehicle, after contact with the cargo-receiving station, may be repelled with high acceleration in a different direction, so that the dwell time of the vehicle at the cargo take-up station is very short. This permits a delivery of many cargoes in short succession and short stoppage times of the vehicles.

Furthermore, it is expedient when the vehicle is driven by the vehicle control unit at a sharp angle against the cargo take-up station.

Advantageously, it is provided that the coefficient of friction of the surface of the cargo receiving portion is reduced before arrival at the cargo take-up station. The coefficient of friction can be reduced for cargo delivery, but during travel the coefficient of friction is high, thus ensuring that the cargo cannot inadvertently leave the cargo receiving portion.

For performance of the method described in the foregoing, the invention also provides a vehicle, which is characterized in that the surface of the cargo receiving portion is designed such that its coefficient of friction at the surface of contact with the cargo is variable.

Shortly before arrival at the cargo take-up station, the vehicle is then oriented in such a way that the cargo receiving portion is open at the side rim pointing in the direction of the cargo take-up station, so that the cargo can reach the cargo take-up station by change of the velocity vector of the vehicle. During a normal travel of the vehicle, the contact face is then adjusted such that the cargo remains securely on the cargo receiving portion. Before the cargo delivery, the coefficient of friction is reduced, so that the cargo, due to its inertia can leave the cargo receiving portion more easily.

According to a first configuration, it may be provided that the control unit is arranged such that, for cargo delivery, it generates a control signal for reduction of the coefficient of friction.

Alternatively, it may also be provided that, for reduction of the coefficient of friction of the contact surface, at least one mechanical release element, e.g. lever, is provided, which can be actuated by physical contact with the cargo take-up station. When the release element is compulsorily mechanically actuated by contact of the vehicle with the cargo take-up station, the contact surface is then changed via a mechanical lever mechanism or the like.

For change of the coefficient of friction of the contact surface, it may be advantageously provided that the cargo receiving portion has at least one support face with a multiplicity of openings and that bearing elements are disposed in the region of the openings, wherein the support face is designed to be relatively displaceable, at least in vertical direction, with respect to the bearing elements.

According to a first configuration, these bearing elements may be designed as rotatably mounted rollers or balls.

Alternatively, the bearing elements may also be designed to be stud-shaped or plank-shaped.

The bearing elements may preferably have a coefficient of friction different from that of the support face, but this is not absolutely necessary if they are designed as rotatably mounted rollers or balls.

Finally, it may be provided that the cargo receiving portion has a rim boundary along at least one side rim, the upper rim of which can be positioned, by relative motion with respect to the surface of the cargo receiving portion, at the level of the surface of the cargo receiving portion or below the level of the surface of the cargo receiving portion. For this purpose, the rim boundary may be designed to be swivelable, for example, or vertically displaceable.

Figure 2:
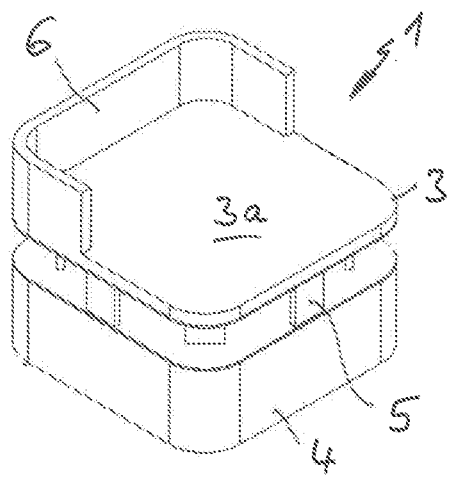
Figure 3:
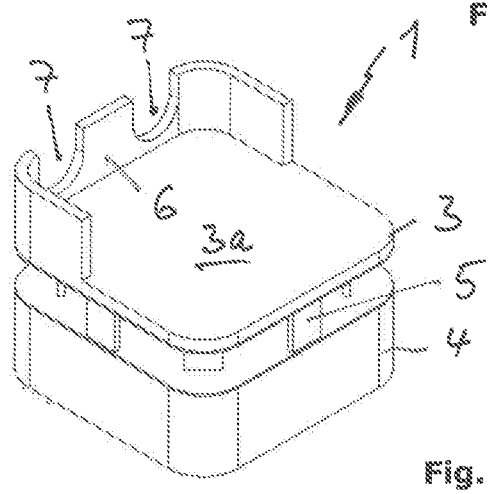
Figure 4:
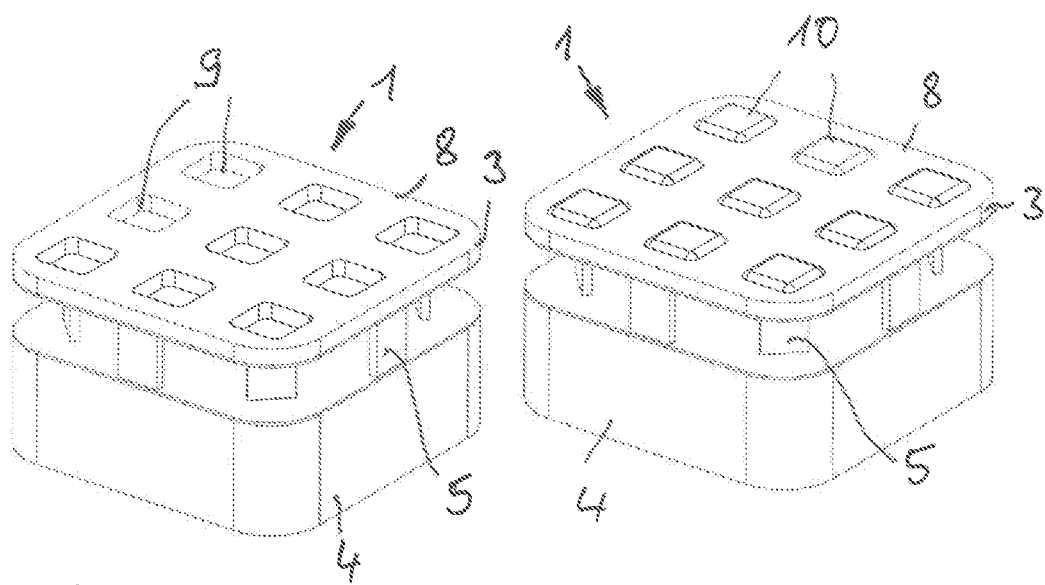
Figure 5:
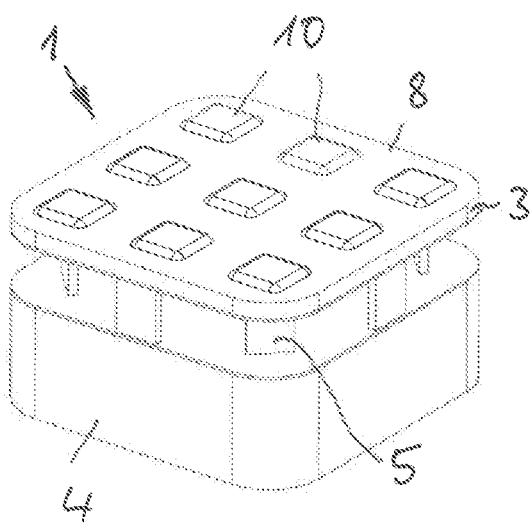
Figure 6:
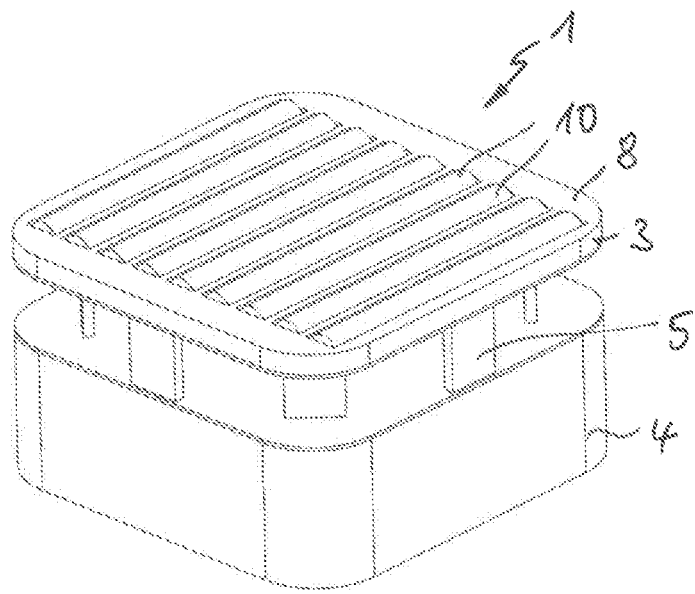
Figures 7, 8:
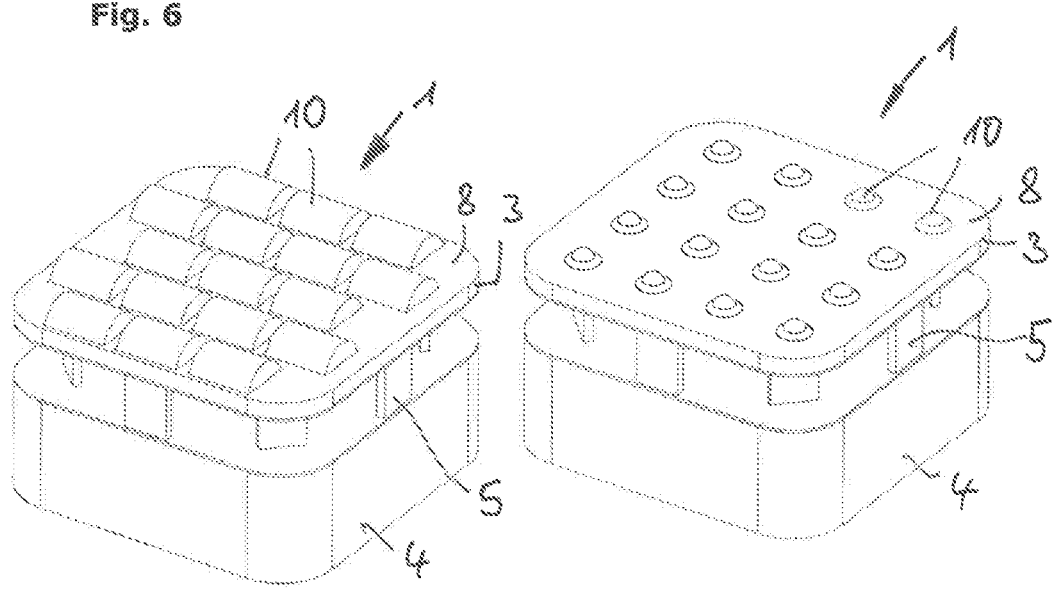
Figure 9:
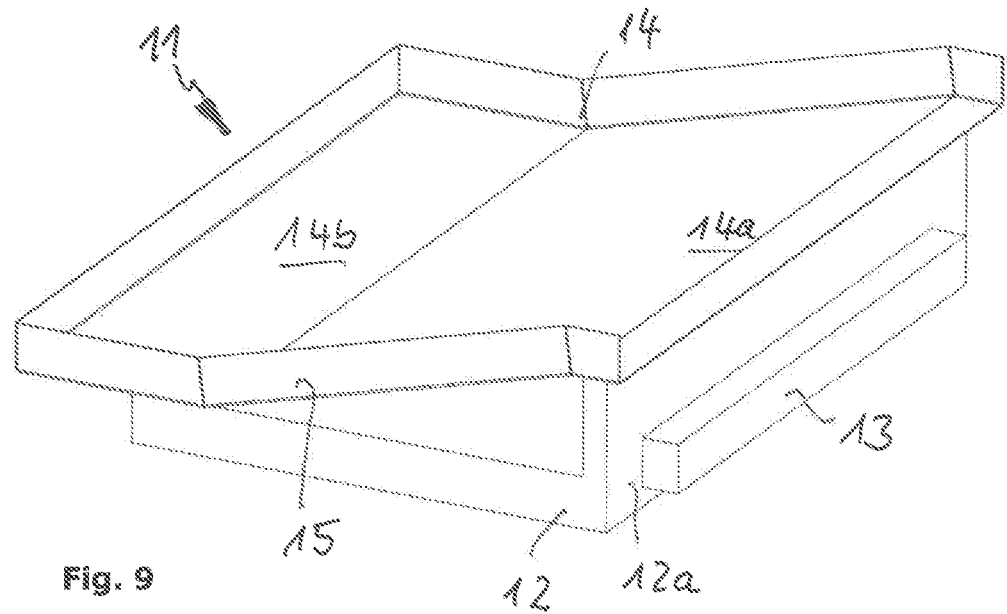
Figure 10:
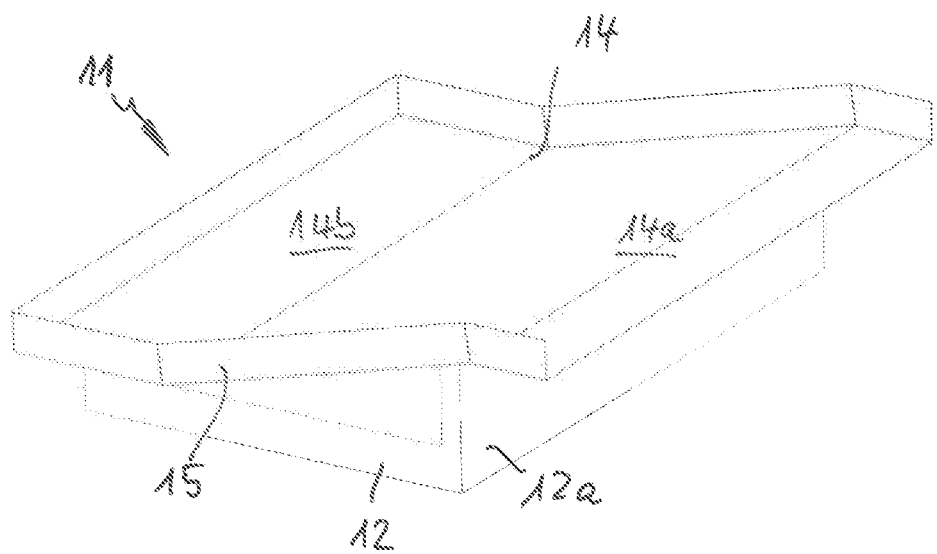
Figure 11:
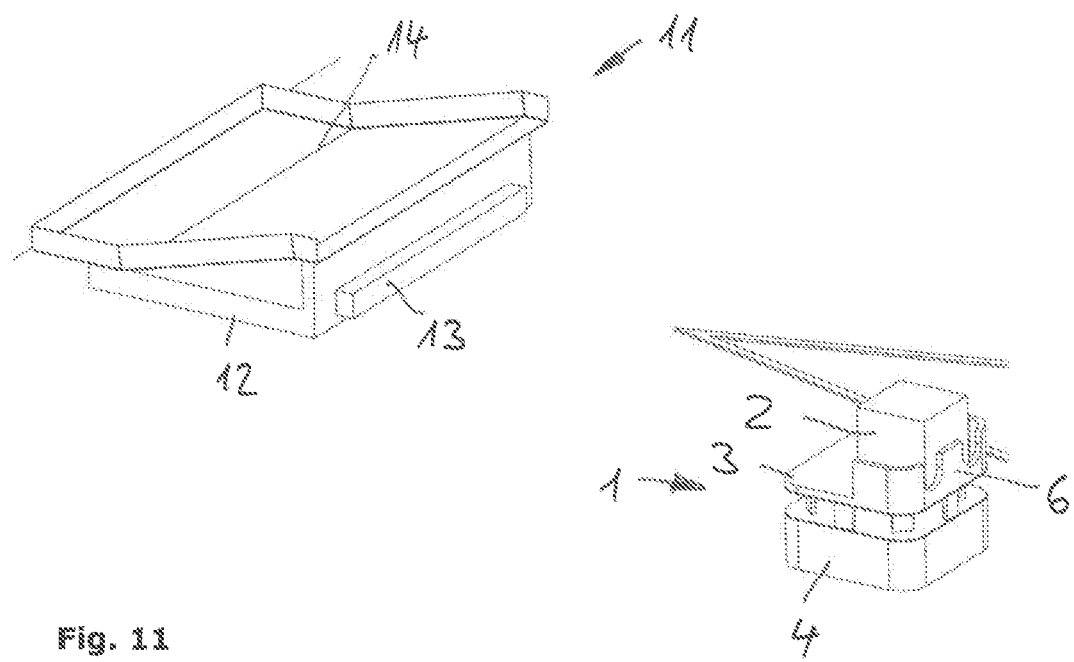
Figure 12:
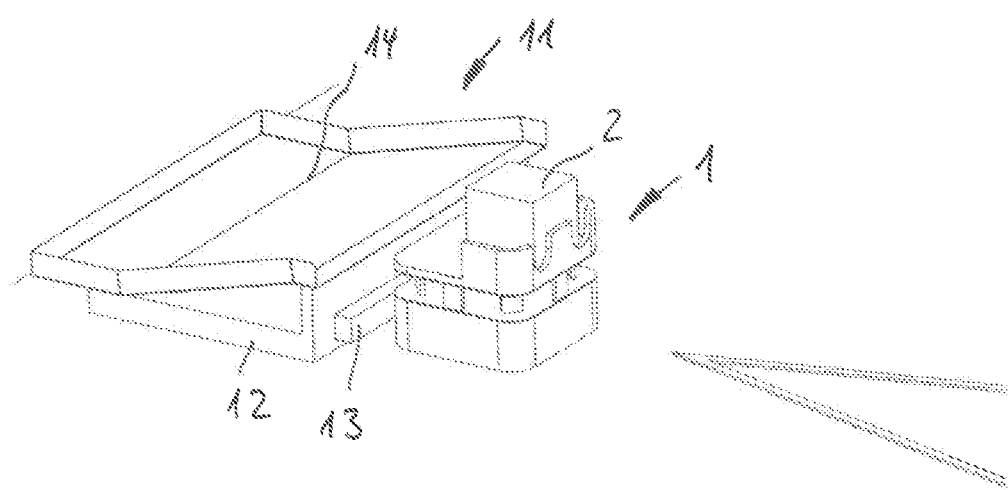
Figure 13:
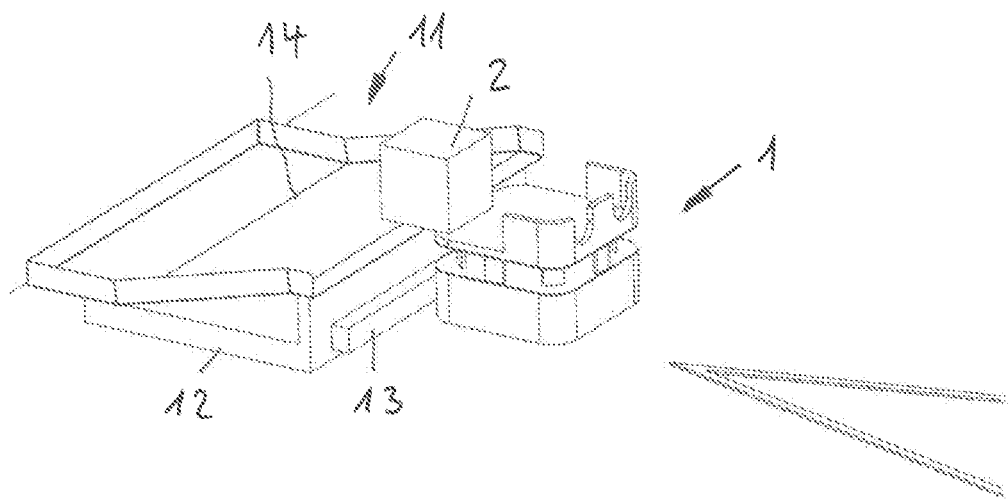
Figure 14:
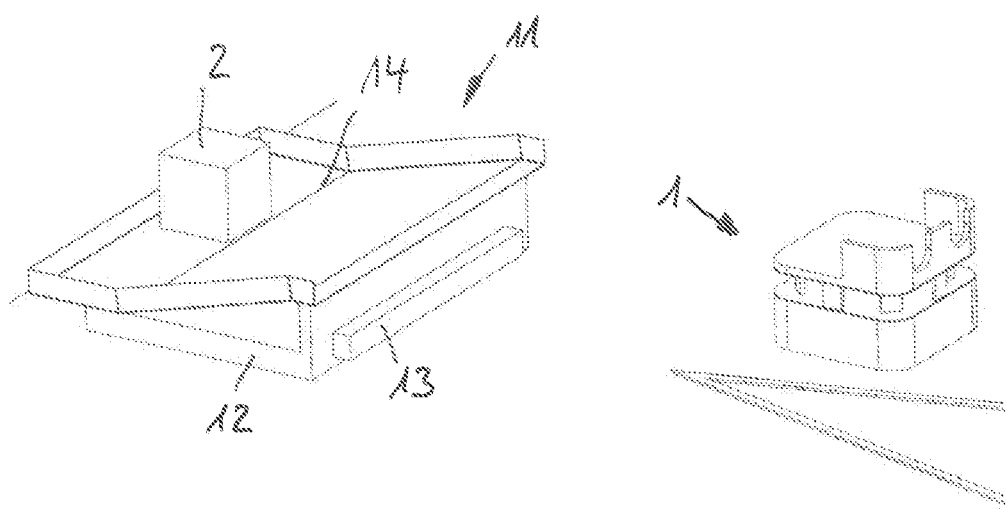

The invention is explained in more detail in the following by way of example on the basis of the drawing. Therein, respectively in perspective view, FIG. 1 shows a schematic diagram of a vehicle suitable for performance of the method according to a first configuration, FIG. 2 shows a schematic diagram of a vehicle according to a second configuration, FIG. 3 shows a schematic diagram of a vehicle according to a third configuration, FIG. 4 shows a schematic diagram of a vehicle according to a fourth configuration, FIG. 5 shows the vehicle according to FIG. 4 in a different position of the cargo receiving portion, FIG. 6 shows a schematic diagram of a vehicle according to a fifth configuration, FIG. 7 shows a schematic diagram of a vehicle according to a sixth configuration, FIG. 8 shows a schematic diagram of a vehicle according to a seventh configuration, FIG. 9 shows a schematic diagram of a cargo take-up station according to a first configuration, FIG. 10 shows a schematic diagram of a cargo take-up station according to a second configuration, FIG. 11 shows a vehicle according to FIG. 3 with cargo before arrival at a cargo take-up station, FIG. 12 shows the vehicle shortly before arrival at the cargo take-up station, FIG. 13 shows the vehicle during the cargo delivery and FIG. 14 shows the vehicle during the departure travel, with cargo having been transferred.

A vehicle suitable for performance of a method described further below with reference to FIGS. 11 to 14 is denoted overall with 1 in the figures. This preferably driverless vehicle 1 for transport and for transfer or delivery of cargo 2 has in the exemplary embodiment according to FIG. 1 a flat cargo receiving portion 3, on which the cargo 2 is disposed for transport. The cargo receiving portion 3 consists, for example, of metal or plastic; in this exemplary embodiment, its surface 3a is planar. The vehicle 1 is furthermore provided with a chassis denoted overall by 4, on the underside of which running rollers or running wheels are disposed, which are not illustrated.

In the illustrated exemplary embodiments, the cargo receiving portion 3 is not directly disposed on the chassis 4, but instead an intermediate body 5 is disposed between the upper side of the chassis 4 and the underside of the cargo receiving portion 3. To secure the cargo 2 on the cargo receiving portion 3 during transport, a rim boundary 6 is provided, which extends only over a partial region of the periphery of the cargo receiving portion 3, so that the vehicle 1 is completely open along one side rim.

In the exemplary embodiment according to FIG. 1, the rim boundary 6 is designed to be plank-shaped in cross section and it extends only along one side of the cargo receiving portion 3.

Alternatively, it may also be provided according to FIG. 2 that the rim boundary, likewise denoted with 6, is designed to be C-shaped in cross section, i.e. compared with the retaining element 6 according to FIG. 1 it is curved or prolonged in angled manner in the corner regions and thus extends partly into the adjoining side rims of the cargo receiving portion 3.

In the embodiment according to FIG. 3, the rim boundary 6 is likewise designed to be C-shaped in cross section, but has two side notches 7. These notches 7 permit an access to the cargo receiving portion 3 even from the side along which the rim boundary 6 is located.

The upper rim 6a of the rim boundary 6 may be designed to be positionable, by relative motion with respect the surface 3a of the cargo receiving portion 3, at the level of the surface 3a of the cargo receiving portion 3 or below the level of the surface 3a of the cargo receiving portion 3. For this purpose the rim boundary 6 may be disposed pivotably on the cargo receiving portion 3. Alternatively, a vertical positioning element may also be provided.

In FIGS. 4 and 5, a vehicle 1 is illustrated in which the cargo receiving portion 3 has at least one support face 8 with a multiplicity of openings 9, wherein bearing elements 10 are disposed in the region of the openings 9. In the exemplary embodiment according to FIGS. 4 and 5, these bearing elements 10 are designed to be stud-shaped and consist, for example, of rubber. In this embodiment they have a higher coefficient of friction than the surface of the support face 8. The support face 8 is designed to be relatively displaceable, at least in vertical direction, with respect to the stud-shaped bearing elements 10. Thereby it is possible that, starting from the position illustrated in FIG. 4, in which the stud-shaped bearing elements 10 are located below the level of the surface of the support face 8, the stud-shaped bearing elements 10 are shifted by relative motion in vertical direction into a position above the level of the surface of the support face 8, so that the cargo 2 then rests no longer on the support face 8 but instead on the stud-shaped bearing elements 10.

In the position illustrated in FIG. 4, the bearing elements 10 are therefore located under the level of the surface of the support face 8, and so they are not active. It is in this position that the vehicle 1 is located during the cargo transfer.

In contrast, FIG. 5 shows the transport position of the vehicle 1. In this position, the stud-shaped bearing elements 10 extend upward through the openings 9, so that the stud-shaped bearing elements 10 are located above the level of the surface of the support face 8 and are active. In this position, the surface of the cargo receiving portion 3 has a higher coefficient of friction than in the position according to FIG. 4.

Alternatively, the stud-shaped bearing elements 10 may also have a lower coefficient of friction than the surface of the support face 8. In this case, FIG. 4 shows the transport position and FIG. 5 the cargo-transfer position.

In FIG. 6 a vehicle is illustrated in which the bearing elements 10 are designed as elongated rollers. The support face 8 is again designed to be relatively displaceable, at least in vertical direction, with respect to the bearing elements 10. Thereby it is possible that, starting from the position illustrated in FIG. 6, in which the bearing elements 10 designed as rollers project upward beyond the surface of the support face 8, the bearing elements 10 are shifted by relative motion in vertical direction below the level of the surface of the support face 8, so that the cargo 2 then rests no longer on the bearing elements 10 but instead only on the support face 8.

When the surface of the support face 8 and the surface of the bearing elements 10 have a different coefficient of friction, the coefficient of friction of the surface of the cargo receiving portion 3 can be changed thereby, depending on whether the cargo 2 is to be transported or delivered. However, the coefficient of friction of the surface may also be the same as that of the bearing elements 10 designed as rollers. If, for cargo delivery or transfer, the bearing elements 10 are raised above the level of the surface of the support face 8 and the vehicle 1 is oriented such that the trajectory of the cargo 2 corresponds to the rolling direction of the bearing elements 10 designed as rollers, the cargo delivery is facilitated, since then only the rolling friction is active.

Alternatively, the roller-shaped bearing elements 10 may also be braked and the braking action may be canceled for cargo delivery.

In FIG. 7, a vehicle 1 almost corresponding to FIG. 6 is illustrated with the single difference that the bearing elements 10 are designed not as rotatably mounted elongated rollers but instead as rotatably mounted roller sections.

In FIG. 8, a vehicle 1 almost corresponding to FIG. 6 is illustrated with the single difference that the bearing elements 10 are designed not as rotatably mounted elongated rollers but instead as rotatably mounted balls.

In FIG. 9, a first embodiment of a cargo take-up station 11 is illustrated. This cargo take-up station 11 has a base 12 with a front side 12a, on which preferably one shock-absorbing and/or spring element 13 (bumper) is disposed.

A receiving area 14, which is open on the front side 12a of the base 12 and otherwise preferably has side rims 15 is disposed on the base 12, designed as an angle profile, of the cargo take-up station 11. In the illustrated exemplary embodiment, the bottom face of the receiving area 14 is inclined downward at first; this area is denoted with 14a and the rear area is horizontal, for example, and denoted with 14b.

In FIG. 10, an alternative cargo take-up station 11 is illustrated which differs from that according to FIG. 9 in that no shock-absorbing and/or spring element 13 is provided.

In FIGS. 11 to 14, a method sequence according to the invention is illustrated by way of example:

In FIG. 11, a cargo receiving portion 11 is illustrated in which no cargo is yet located. Instead, a cargo 2 is disposed on a vehicle 1, which is in normal travel and which is scheduled to deliver the cargo 2 onto the cargo take-up station 11. In this case the vehicle 1 is already oriented such that the rim boundary 6, viewed in travel direction, is located at the rear, so that the cargo receiving portion 3, viewed in travel direction, is open in front and the cargo 2 can be delivered accordingly toward the front.

In FIG. 12, a situation is illustrated in which the vehicle 1 is located a short distance in front of the cargo take-up station 11. The velocity vector of the vehicle 1 may already have been changed to the effect that the vehicle 1 has changed its direction and/or has been braked by the vehicle control unit. However, the vehicle 1 may also travel with unchanged velocity. The cargo 2 is still located on the vehicle 1.

In FIG. 13, a position is illustrated in which the cargo 2 is moving from the vehicle 1 or the cargo receiving portion 3 onto the cargo take-up station 11, after the vehicle 1 has reached the cargo take-up station 11, wherein it is being driven without braking or with reduced velocity against the shock-absorbing and/or spring element 13. Due to the change of the velocity vector of the vehicle 1, the cargo 2 is moved due to its inertia in the original direction from the cargo receiving portion 3 into the receiving area 14 of the cargo take-up station 11.

When the vehicle 1 is designed such that the coefficient of friction of the surface 3a of the cargo receiving portion 3 can be reduced (embodiment according to FIGS. 4 to 8), the coefficient of friction is appropriately reduced for facilitation of the delivery of the cargo 2, which can be caused by a control signal of the vehicle control unit or alternatively even by a release element on the vehicle 1, which can be actuated by the impact against the cargo take-up station 11 and brings about the change via a kinematic system (lever mechanism or the like).

The end position is illustrated in FIG. 14. The cargo 2 is located in the cargo take-up station 11, the vehicle 1 has already departed from the cargo take-up station 11 and no cargo is located any longer on its cargo receiving portion 3. The vehicle 1 may be re-accelerated by the impact against the shock-absorbing and/or spring element 13 or for continued travel it may be additionally or alternatively moved with increasing velocity by the vehicle control unit.

Of course, the invention is not limited to the illustrated exemplary embodiments. Further embodiments are possible without departing from the basic concepts. Thus at least one guide device disposed in the region of the cargo take-up station 11 may be provided, by means of which, before arrival at the cargo take-up station, the vehicle 1 is oriented in such a way that the trajectory of the cargo 2 moving away from the cargo receiving portion 3 due to the change in the velocity vector ends in the receiving area 14 of the cargo take-up station 11.

The latter may also be realized in that the cargo take-up station 11 has a ramp, on which the vehicle approaches before the cargo delivery. At the end of the ramp, the cargo is released by change of the velocity vector and flies as it were in an arc into the receiving area 14 of the cargo take-up station 11. In this connection, a further ramp, for example, may be provided in the landing area for reduction of the necessarily acting forces. The cargo 2 then lands softly and slides downward into a collecting area of the cargo take-up station 11 (comparable with the flight path of a ski jumper). Alternatively to this, an inclined approach to the ramp is also possible.

LIST OF REFERENCE SYMBOLS

1 Vehicle
2 Cargo
3 Cargo receiving portion
3*a* Surface
4 Chassis
5 Intermediate body
6 Rim boundary
6*a* Upper rim
7 Notches
8 Support face
9 Openings
10 Bearing elements
11 Cargo take-up station
12 Base
12*a* Front side
13 Shock-absorbing and/or spring element
14 Receiving area
14*a* Area
14*b* Area

The invention claimed is:

1. A method for transfer of cargo (2) from a cargo receiving portion (3) of a vehicle (1) to a cargo take-up station (11), wherein the vehicle (1) is controlled by a vehicle control unit in such a way that the vector of the velocity of the vehicle (1) is changed immediately before or upon arrival at the cargo take-up station (11) by braking the vehicle (1) and/or changing the direction of the velocity of the vehicle (1) and the vehicle (1), before arrival at the cargo take-up station (11), is oriented by the vehicle control unit and/or by at least one guide device disposed in the region of the cargo take-up station (11) in such a way that the trajectory of the cargo (2) moving away from the cargo receiving portion (3) due to the change of the velocity vector of the vehicle (1) ends in a receiving area (14) of the cargo take-up station (11).

2. The method according to claim 1, wherein the vehicle (1) is driven by the vehicle control unit against the cargo take-up station (11).

3. The method according to claim 1, wherein the vehicle (1) is driven by the vehicle control unit against the cargo take-up station (11) without being braked.

4. The method according to claim 2, wherein the vehicle (1) is driven by the vehicle control unit at a sharp angle against the cargo take-up station (11).

5. The method according to claim 1, wherein the coefficient of friction of the surface (3*a*) of the cargo receiving portion (3) is reduced before arrival at the cargo take-up station (11).

6. A vehicle for performance of the method according to claim 5 with a cargo receiving portion (3), which is disposed on a chassis (4),
wherein the cargo receiving portion (3) is designed to be open or openable along at least one side rim,
wherein the vehicle has a vehicle control unit, and
wherein the surface (3*a*) of the cargo-receiving portion (3) is designed such that its coefficient of friction at the surface of contact with the cargo (2) is variable.

7. The vehicle according to claim 6, wherein the control unit is arranged such that, for cargo delivery, the control unit generates a control signal for reduction of the coefficient of friction.

8. The vehicle according to claim 6, wherein, for reduction of the coefficient of friction of the contact surface, at least one mechanical release element is provided, which can be actuated by physical contact with the cargo take-up station (11).

9. The vehicle according to claim 6, wherein the cargo receiving portion (3) has at least one support face (8) with a multiplicity of openings (9) and wherein bearing elements (10) are disposed in the region of the openings (9), wherein the support face (8) is designed to be relatively displaceable, at least in vertical direction, with respect to the bearing elements (10).

10. The vehicle according to claim 9, wherein the bearing elements (10) are designed as rotatably mounted rollers or balls.

11. The vehicle according to claim 9, wherein the bearing elements (10) are designed to be stud-shaped or plank-shaped.

12. The vehicle according to claim 9, wherein the bearing elements (10) have a different coefficient of friction compared with the support face (8).

13. The vehicle according to claim 6, wherein the cargo receiving portion (3) has a rim boundary (6) along at least one side rim, the upper rim (6*a*) of which can be positioned, by relative motion with respect to the surface (3*a*) of the cargo receiving portion (3), at the level of the surface (3*a*) of the cargo receiving portion (3) or below the level of the surface (3*a*) of the cargo receiving portion (3).

* * * * *